Figure 1:
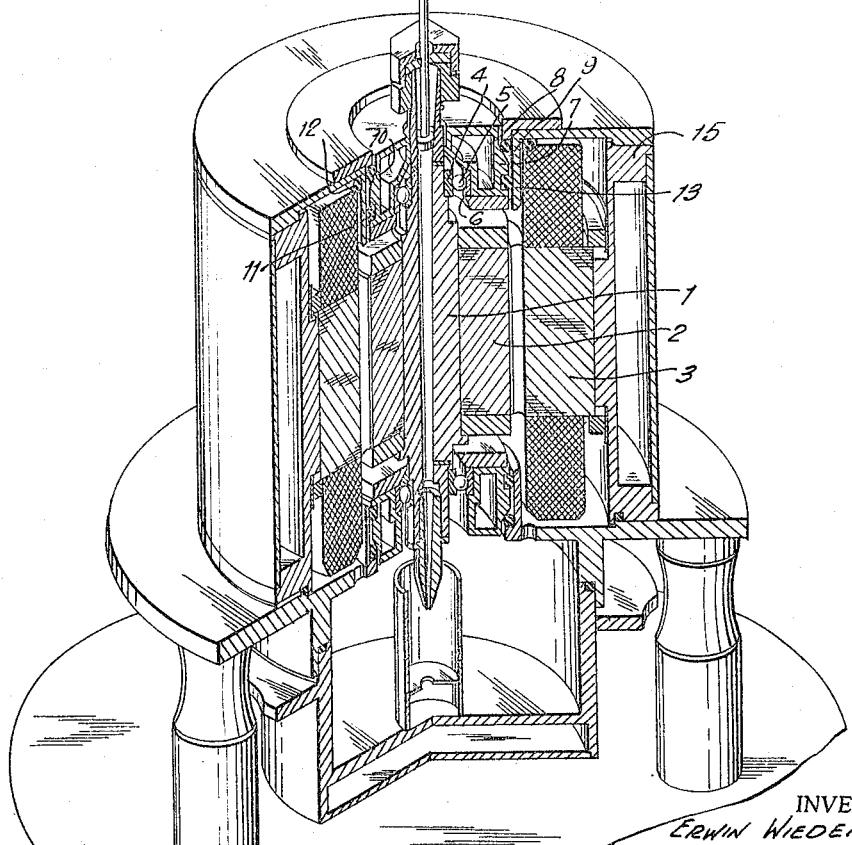

Aug. 2, 1966    E. WIEDEMANN    3,264,503
HIGH SPEED ELECTRIC MOTORS
Filed April 5, 1965    2 Sheets-Sheet 1

INVENTOR.
ERWIN WIEDEMANN
BY Jacobs & Jacobs
His ATTORNEYS

United States Patent Office 3,264,503
Patented August 2, 1966

3,264,503
HIGH SPEED ELECTRIC MOTORS
Erwin Wiedemann, Riehen, near Basel, Switzerland, assignor to Sandoz Ltd. (also known as Sandoz A.G.), Basel, Switzerland
Filed Apr. 5, 1965, Ser. No. 445,501
1 Claim. (Cl. 310—51)

The present invention is concerned with electric motors which are adapted to run at speeds in excess of 50,000 revolutions per minute (hereinafter referred to as r.p.m.). Such motors are particularly useful to operate ultracentrifuges, gyroscopes and compressors. This application is a continuation-in-part of my co-pending application Serial Number 181,413, filed March 21, 1962, now abandoned.

It is known in the art to construct motors which are theoretically capable of operating at speeds in excess of 50,000 r.p.m. However, as a practical matter, it is very difficult to actually operate such motors vibration free at such high speeds because such motors are not inherently capable of achieving a co-incidence of the axes of inertia and rotation.

When dealing with high speed motors in general, it is necessary to balance them dynamically and statically in order to avoid excessive vibrations. Even with the most modern equipment currently available, it is nevertheless impossible to balance a motor exactly to the theoretical optimum so that a slight degree of unbalance always remains. This unbalance takes on particular significance at high speeds as the detrimental effects thereof increase proportionally to the square of the speed. When high speed motors are to be operated at speeds approaching 50,000 r.p.m., therefore, even careful balancing still fails to achieve co-incidence of the axes of inertia and rotation. This failure to achieve such co-incidence causes vibrations which set an upper limit as to the maximum speed of rotation at which the motor can safely be operated. This upper limit is always below the theoretical upper limit governed by the construction of the motor. Such safe upper limit is generally less than 50,000 r.p.m. when fabricated by usual production techniques.

It should furthermore be pointed out that the problems arising out of this balancing technique include complicating factors due to high speeds at which high speed motors, such as those with which the present invention is concerned, operate and vary from those problems present in low speed electric motors such as motors rotating at the speed of dynamo electric machines. This difference is thought to be due to the fact that at the very high rotational speeds of motors of the present invention, that is in excess of 50,000 r.p.m., the rotating system can no longer be regarded as substantially fixed, since under the influence of the prevailing strong centrifugal forces, deformation of the rotating system occurs and thus the center of gravity becomes displaced.

From the above it may be clearly seen that motors running in excess of speeds of 50,000 r.p.m. are incapable of running vibration free and safely at such high speeds for two main reasons, namely; (1) The effects of the residual unbalance increase by a factor of the square of the speed and, (2) the rotating system can no longer be regarded as fixed.

It is an object of the present invention to provide an electric motor in which the above referred to disadvantages are minimized so that the motors with the mounting means disclosed herein, are capable of operating vibration free and without additional load of the bearings at speeds greatly in excess of 50,000 r.p.m. The above object is obtained in accordance with the invention by achieving unusually close co-incidence of the axes of inertia and rotation. It is important to note that the present invention achieves such close co-incidence of the axes of inertia and rotation by allowing the rotor, as a result of its speed of rotation, to adjust itself, of its own accord into the correct axis of inertia. This is in strong contrast to all hitherto accepted principles for the construction of electric motors. It has hitherto always been the contention that the air gap between the rotor and the stator must remain constant so that the magnetic field is not in any way affected. As a result hereof, the rotor has hitherto always been mounted within the stator and, while damping means have been employed to enable smoother operation of the high speed motors, these damping means were utilized in such a manner that the relationship of the rotor to the stator remained rigid, i.e. damping means served the purpose of damping the motor as a whole and not of allowing movement of the rotor with respect to the stator. By allowing the rotor to move within small limits inside the stator, a phenomenon which is inherent in rotating systems causes the rotor to strive for co-incidence of its axes of inertia and rotation. It should be pointed out here that the theoretical co-incidence will be achieved at infinite speed. As a result hereof, the higher the speed at which the motor operates, the closer does the axis of rotation get to the axis of inertia.

In contrast to all hitherto constructed motors, therefore, in a motor in accordance with the present invention speed does not put a limit on the motor as a result of the residual unbalance, on the contrary, the higher the speed, the smaller the unbalance. This procedure is quite novel and unobvious, because motors which are constructed to theoretically operate at speeds in excess of 50,000 r.p.m., do not inherently achieve co-incidence of the axes of inertia and rotation because such motors are constructed in such a manner that, no matter what damping means they might employ, the rotor and stator are always in fixed relation to one another. As a result hereof any residual error which might occur when originally balancing the motor (and it must be stressed that such residual errors do always occur) will cause detrimental effects which, as has been hereinbefore stated, increase in proportion to the square of the speed of rotation. As a result of the mounting of the rotor in fixed relation to the stator, this residual error can not be eliminated and, no matter what damping means might be utilized to damp the motor as a whole, the cause of the vibrations, of the excess stress on the bearings and their detrimental effects, are inherent in the motor and cannot be eliminated by external means.

The instant invention provides an electric motor adapted to operate at speeds of at least 50,000 r.p.m., which comprises a stator housing, a stator within that housing, a rotor positioned within the stator, two radial bearings which support the rotor, an elastic mounting for each of the bearings which mounting has a groove and at least one elastomer ring which is placed within the groove and which is held in place by the action of the groove and the stator housing. This enables the axes of inertia and rotation to coincide during operation of the motor at speeds in excess of 50,000 r.p.m., because the elastic mounting of the rotor allows the rotor to undergo minute, damped movement about its center position thus allowing it, of its own accord as the speed increases, to strive for a coincidence of its axes of inertia and rotation.

Figure 2:
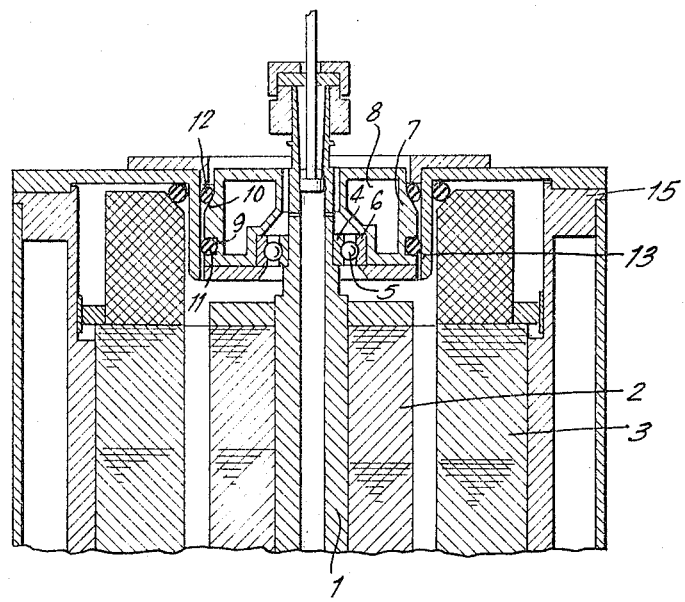

In a preferred embodiment of the present invention shown in FIGURES 1 and 2 two elastomer rings are employed, one is placed within the aforementioned groove and held in place by the groove and the stator housing and the other is placed between a conical portion of the elastic mountings and the stator housing. It should also be noted that the intermediate mounting rings may be provided with a duct through which a cooling fluid may be circulated to cool the bearings.

The following non-limitative example shows a motor and mounting means which forms part of an ultra-centrifuge. The motor is capable of rotational speeds of at least 75,000 r.p.m.

*Example*

Stator housing 15 comprises an axle 1 carrying a rotor 2 within a stator 3 supported by upper and lower bearings, each consisting of inner rings 4, ball bearings 5 and outer rings 6. Said outer rings 6 fit tightly in the intermediate mounting rings 7 which have a duct 8. Each of the mounting rings 7 has a groove 9 and conical portion 10 which are in contact with elastomer rings 11 and 12 respectively. The elastomer rings 11 and 12 are held in position by a stator housing 15 and by flanges 13. The elastomer rings 11 are compressed by the groove 9 and the flange 13, and they, together with rings 12, constitute an elastic mounting for the rotor 2.

The rotor 2 weights 1.2 kg. and has a bearing spacing of 9 cm.; it has previously been balanced statically and dynamically to 0.05 and 2×0.005g unbalance respectively. The difference in position of the axes of rotation and inertia at the bearings is calculated to be 0.01 mm. at the bearings. Taking into consideration the safety factor and deformations which occur at high speeds, the required radial movement of the bearings is calculated to be ±0.4 mm.

The internal diameter of the stator housing 15 is 52 mm. while the external diameter of the mounting rings 7 is 50 mm. The grooves 9 provided in the mounting rings 7 have a depth of 2 mm. and a width of 3.5 mm. and are provided symmetrically about the central plane of the bearings. The conical portion 10 is machined at an angle of 30° to the rotor axis and is at a distance of 11 mm. from the central plane of the bearings. The elastomer rings 11 are O-rings having an inner diameter of 44.45 mm. and an outer one of 51.51 mm.; they are supplied by Edwards High Vacuum Ltd. of Crawley, England, under the designation silicone rubber, No. VOR 149. These rings have a tension strength of 700 to 1500 lbs. per square inch, an ultimate elongation of 100 to 400% to B.S. 903 and a tear strength of 4 to 15 lbs.

In order to assemble the motor, the rings 11 are forced into the grooves 9 of the mounting rings 7. The axle 1, rotor 2, bearings 4, 5, 6, mounting rings 7 and elastomer rings 11 are then pushed into the stator housing 15. Elastomer rings 12, which have the same characteristics and measurements as elastomer rings 11, are then put into position between the conical portion 10 and the stator housing 15, where they are held in position by means of flanges 13.

In operation, a cooling fluid is circulated through the duct 8 of the mounting rings 7 for the purpose of cooling the bearings 4, 5 and 6.

FIGURE 2 is an enlarged section of the bearing structure of FIGURE 1.

On running the motor, speeds of 75,000 r.p.m. or higher are attained without damage. A similar motor without the mountings of the invention was damaged when it was attempted to run it at speeds of 60,000 r.p.m., its safe maximum speed being less than 50,000 r.p.m.

When the specific embodiment of the electric motor of the invention shown in the drawings attains its normal running speed, e.g. 75,000 r.p.m., the axis of rotation and the axis of inertia approximately coincide, because the higher the speed, the stronger are the forces which direct the rotor to spin about its centroidal axis. It is believed that the bearings execute small damped movements in a radial and axial direction to the rotor. It will be appreciated that the entire rotating system becomes slightly displaced when the electric motor is in use and that this displacement is relative to the stator.

Other and further uses for the instant invention will be fully appreciated by those skilled in the art by reference to the foregoing specification and example and further with reference to the appended claim.

What is claimed is:

An electric motor capable of running at speeds of at least 50,000 r.p.m. comprising:
(a) a stator housing;
(b) a stator disposed within the stator housing;
(c) a self-adjusting, speed responsive rotor disposed within the stator;
(d) two radial bearings supporting the rotor;
(e) each radial bearing being elastically supported at two spaced regions and having a grove therein and a conical end portion;
(f) two elastomer rings, one disposed within the groove and held in place by the groove and the stator housing, and the other disposed between the conical end portion and the stator housing;

whereby the rotor executes limited, damped movement in a direction radial to the stator so that during operation of the motor at speeds in excess of 50,000 r.p.m. the entire rotating system becomes slightly displaced relative to the stator.

References Cited by the Examiner

UNITED STATES PATENTS

| | | | |
|---|---|---|---|
| 1,641,091 | 8/1927 | Minck | 310—51 |
| 2,238,435 | 4/1941 | Perry | 310—51 |
| 2,643,351 | 6/1953 | Feiertag | 310—51 |
| 2,810,084 | 10/1957 | Sprando | 310—51 |

FOREIGN PATENTS 647,267   12/1950   Great Britain.

MAX L. LEVY, *Primary Examiner.*

MILTON O. HIRSHFIELD, *Examiner.*

L. L. SMITH, *Assistant Examiner.*